United States Patent
Iijima et al.

(10) Patent No.: US 8,390,748 B2
(45) Date of Patent: Mar. 5, 2013

(54) ELECTRO-OPTICAL DISPLAY DEVICE AND PROJECTOR

(75) Inventors: Chiyoaki Iijima, Ina (JP); Kazuhiro Nishida, Sapporo (JP); Katsumitsu Hama, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 250 days.

(21) Appl. No.: 12/791,249

(22) Filed: Jun. 1, 2010

(65) Prior Publication Data

US 2010/0309396 A1  Dec. 9, 2010

(30) Foreign Application Priority Data

Jun. 5, 2009  (JP) ................. 2009-135869

(51) Int. Cl.
*G02F 1/1333* (2006.01)
*G03B 21/00* (2006.01)
(52) U.S. Cl. .......................... 349/5; 349/158
(58) Field of Classification Search .......... 349/5, 8, 349/9, 158; 353/31, 34, 122
See application file for complete search history.

(56) References Cited

U.S. PATENT DOCUMENTS

| | | | |
|---|---|---|---|
| 6,542,685 B1 * | 4/2003 | Yoneda | 385/130 |
| 6,731,367 B1 | 5/2004 | Saitoh | |
| 6,788,377 B1 * | 9/2004 | Ogawa et al. | 349/151 |
| 6,982,181 B2 | 1/2006 | Hideo | |
| 7,068,343 B2 | 6/2006 | Saitoh | |
| 7,310,127 B2 | 12/2007 | Sato et al. | |
| 2005/0007540 A1 * | 1/2005 | Tsuboi et al. | 349/158 |

FOREIGN PATENT DOCUMENTS

| | | |
|---|---|---|
| CN | 1580914 A | 2/2005 |
| JP | A-2001-100643 | 4/2001 |
| JP | A-2004-246080 | 9/2004 |
| JP | A-2004-311955 | 11/2004 |
| JP | A-2006-235010 | 9/2006 |
| JP | A-2007-206723 | 8/2007 |
| JP | A-2008-9455 | 1/2008 |

\* cited by examiner

*Primary Examiner* — Dung Nguyen
*Assistant Examiner* — Tai Duong
(74) *Attorney, Agent, or Firm* — Oliff & Berridge, PLC

(57) ABSTRACT

An electro-optical display device includes: a transmission-type liquid crystal panel that has a driving substrate and an opposing substrate facing each other with a liquid crystal interposed therebetween; a first light-transmissive substrate that is disposed on an outer side of the driving substrate; and a second light-transmissive substrate that is disposed on an outer side of the opposing substrate, wherein any one or more values of thermal expansion coefficients of a plurality of element substrates including at least the driving substrate, the opposing substrate, the first light-transmissive substrate, and the second light-transmissive substrate are negative, and any one or more values of the thermal expansion coefficients of the plurality of element substrates are positive.

10 Claims, 8 Drawing Sheets

ELECTRO-OPTICAL DISPLAY DEVICE AND PROJECTOR

BACKGROUND

1. Technical Field

The present invention relates to an electro-optical display device for image formation and a projector in which the electro-optical display device is built.

2. Related Art

As electro-optical display devices that are built in a projector or the like, there are devices having a structure in which dust-protective substrates are attached on the outer faces (light incident and outgoing side faces) of a driving substrate and an opposing substrate configuring a transmission-type liquid crystal device. Of such devices, in order to reduce display unevenness, an electro-optical display device, which is configured by a transmission-type liquid crystal device, using low-expansion glass having an absolute value of the average linear expansion coefficient that is equal to or lower than $10 \times 10^{-7}$ [/° C.] as a substrate material is proposed (see JP-A-2008-9455). In such a case, other than a liquid crystal substrate and the dust-protective substrates configuring the liquid crystal device, support substrates of one pair of polarizing plates disposed with the liquid crystal device interposed therebetween for displaying an image are also formed from low-expansion glass, and whereby suppressing the occurrence of a phase difference due to distortion. In addition, in JP-A-2008-9455, as examples of the low-expansion glass, there are 7971 titanium silicate glass, silica glass, and the like.

Other than the above-described devices, there are electro-optical display devices that use a material such as silica glass, Neoceram (registered trademark), or the like having high thermal conductance as the material of the dust-protective substrates and the liquid crystal substrate (see JP-A-2006-235010 and JP-A-2004-311955).

However, even when the low-expansion glass is used, generally, the linear expansion coefficient cannot be zero, and there is limitation on the decrease in display unevenness. Thus, there are cases where marked display unevenness is formed due to a phase difference that is generated depending on stress accompanying with heating in transmission-type liquid crystal devices in which the dust-protective substrates and the like are formed, for example, from silica glass.

SUMMARY

An advantage of some aspects of the invention is that it provides an electro-optical display device that is configured to include a transmission-type liquid crystal panel and is capable of additionally suppressing the display unevenness.

Another advantage of some aspects of the invention is that it provides a projector in which the above-described electro-optical display device is built.

According to an aspect of the invention, there is provided an electro-optical display device including: a transmission-type liquid crystal panel that has a driving substrate and an opposing substrate facing each other with a liquid crystal interposed therebetween; a first light-transmissive substrate that is disposed on an outer side of the driving substrate; and a second light-transmissive substrate that is disposed on an outer side of the opposing substrate. Any one or more values of thermal expansion coefficients of a plurality of element substrates including at least the driving substrate, the opposing substrate, the first light-transmissive substrate, and the second light-transmissive substrate are negative, and any one or more values of the thermal expansion coefficients of the plurality of element substrates are positive.

In the above-described electro-optical display device, any one or more of values of the thermal expansion coefficients of the plurality of element substrates configured to include the driving substrate, the opposing substrate, the first light-transmissive substrate, the second light-transmissive substrate, and the like are negative, and any one or more of the values are positive. Accordingly, a phase difference given to passing light due to distortion generated due to a temperature distribution or the like within the element substrate having a negative thermal expansion coefficient and a phase difference given to passing light due to distortion generated due to a temperature distribution or the like within the element substrate having a positive thermal expansion coefficient are operated to offset with each other. Therefore, the effect of a decrease in the phase difference achieved by the plurality of element substrates as a whole can be higher than the effect of a decrease in the phase difference that is achieved by decreases in the distortion of individual element substrates. As a result, the display unevenness of the electro-optical display device can be further suppressed.

In a specific aspect or embodiment of the invention, in the above-described electro-optical display device, when the thermal expansion coefficients of the driving substrate, the opposing substrate, the first light-transmissive substrate, and the second light-transmissive substrate are respectively $\alpha 1$, $\alpha 2$, $\alpha 3$, and $\alpha 4$, refractive indices of the driving substrate, the opposing substrate, the first light-transmissive substrate, and the second light-transmissive substrate are respectively n1, n2, n3, and n4, and values of thicknesses of the driving substrate, the opposing substrate, the first light-transmissive substrate, and the second light-transmissive substrate are respectively d1, d2, d3, and d4, it may be configured that the refractive indices n1 to n4 are within the range of $1.5 \pm 0.1$, and a product sum operation value $d1 \cdot \alpha 1 + d2 \cdot \alpha 2 + d3 \cdot \alpha 3 + d4 \cdot \alpha 4$ of the thicknesses and the thermal expansion coefficients is within the range of $0 \pm 17 \times 10^{-7}$ [mm/K]. In such a case, an unintended phase difference that is given to the luminous flux passing through a combination of the driving substrate, the opposing substrate, the first light-transmissive substrate, and the second light-transmissive substrate can be decreased in consideration of thicknesses, thermal expansion coefficients, and the like.

In one aspect of the invention, in the above-described electro-optical display device, the product sum operation value $d1 \cdot \alpha 1 + d2 \cdot \alpha 2 + d3 \cdot \alpha 3 + d4 \cdot \alpha 4$ of the thicknesses and the thermal expansion coefficients may be within the range of $0 \pm 6 \times 10^{-7}$ [mm/K].

In one aspect of the invention, in the above-described electro-optical display device, a product sum operation value $n1 \cdot d1 \cdot \alpha 1 + n2 \cdot d2 \cdot \alpha 2 + n3 \cdot d3 \cdot \alpha 3 + n4 \cdot d4 \cdot \alpha 4$ of the refractive indices, the thicknesses, and the thermal expansion coefficients may be within the range of $0 \pm 24 \times 10^{-7}$ [mm/K]. In such a case, an unintended phase difference that is given to the luminous flux passing through a combination of the driving substrate, the opposing substrate, the first light-transmissive substrate, and the second light-transmissive substrate can be decreased in consideration of refractive indices, thicknesses, and thermal expansion coefficients.

In one aspect of the invention, in the above-described electro-optical display device, the product sum operation value $n1 \cdot d1 \cdot \alpha 1 + n2 \cdot d2 \cdot \alpha 2 + n3 \cdot d3 \cdot \alpha 3 + n4 \cdot d4 \cdot \alpha 4$ of the refractive indices, the thicknesses, and the thermal expansion coefficients may be within the range of $0 \pm 9 \times 10^{-7}$ [mm/K].

In one aspect of the invention, in the above-described electro-optical display device, it may be configured that the thermal expansion coefficients of the driving substrate, the opposing substrate, the first light-transmissive substrate, and the second light-transmissive substrate are respectively $\alpha 1$, $\alpha 2$, $\alpha 3$, and $\alpha 4$, and values of thicknesses of the driving substrate, the opposing substrate, the first light-transmissive substrate, and the second light-transmissive substrate are respectively d1, d2, d3, and d4, absolute values of a maximum value and a minimum value of respective product sum values d1·$\alpha 1$, d2·$\alpha 2$, d3·$\alpha 3$, and d4·$\alpha 4$ of the thicknesses and the thermal expansion coefficients may be equal to or greater than $3 \times 10^{-7}$ [mm/K]. In such a case, a phase different generated by an element substrate having a high positive thermal expansion coefficient and a phase difference generated by an element substrate having a high negative thermal expansion coefficient can be easily balanced with each other in a relatively simple manner. Accordingly, the display unevenness of the electro-optical display device can be suppressed in an easy manner.

In one aspect of the invention, in the above-described electro-optical display device, it may be configured that one of values of the thermal expansion coefficients of the driving substrate and the first light-transmissive substrate is negative, and the other is positive, and one of values of the thermal expansion coefficients of the opposing substrate and the second light-transmissive substrate is negative, and the other is positive. In such a case, phase differences generated by the driving substrate and the first light-transmissive substrate that are disposed on the light outgoing side of the liquid crystal layer are offset, and phase differences generated by the opposing substrate and the second light-transmissive substrate that are disposed on the incident side of the liquid crystal layer are offset. Accordingly, the occurrence of display unevenness can be suppressed more assuredly.

According to another aspect of the invention, there is provided a projector including: at least one or more of the above-described electro-optical display devices; an illumination device that illuminates the at least one or more of the electro-optical display devices; and a projection lens that projects an image formed by the at least one or more of the electro-optical display devices. Here, the electro-optical display device serves as an optical modulation device for modulating illumination light.

The projector includes the above-described electro-optical display device. Accordingly, the projector can form an image in which display unevenness is suppressed, and whereby a high-quality image can be projected.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
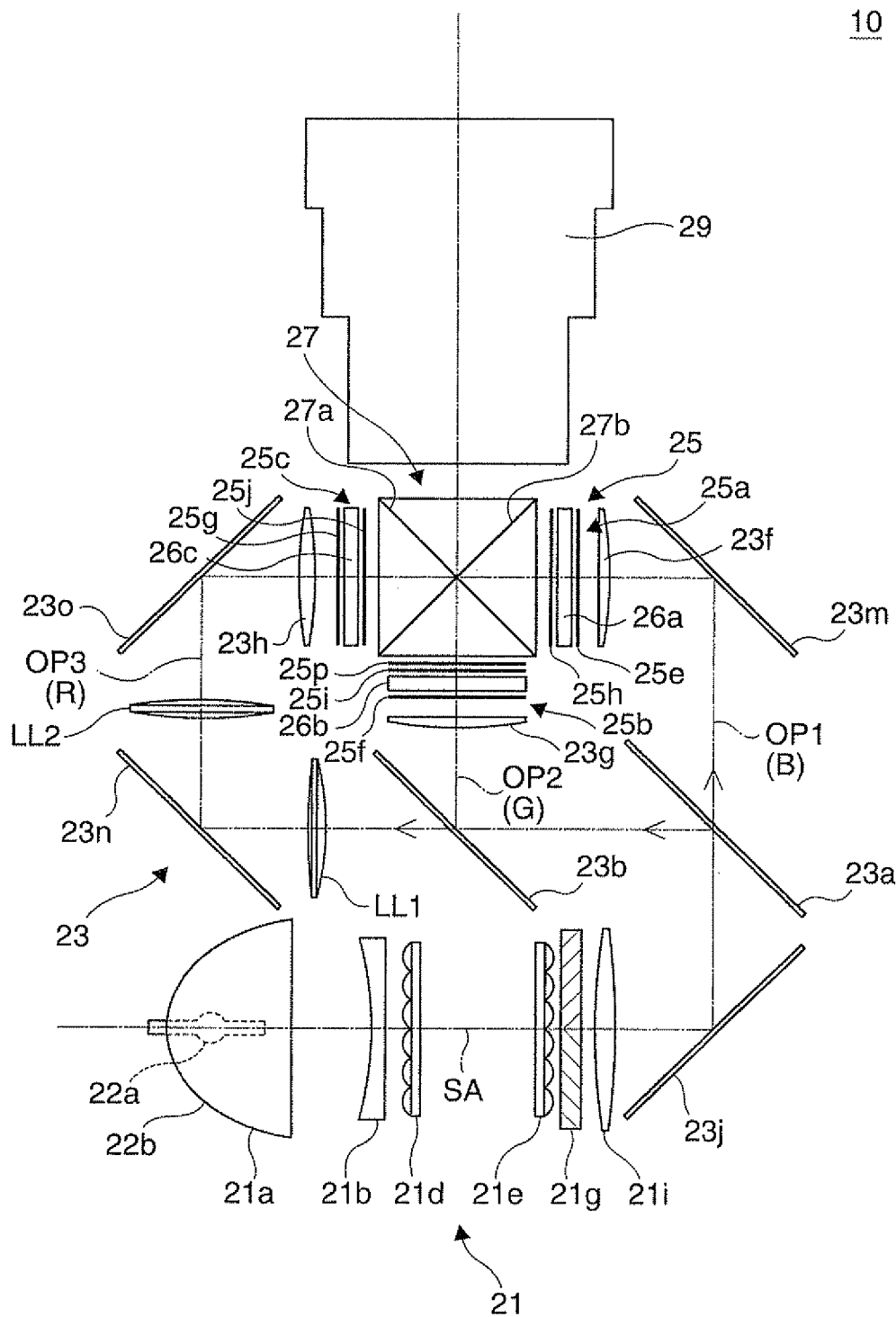
FIG. 1 is a diagram showing an optical system of a projector in which a liquid crystal unit according to a first embodiment is built.

FIG. 1 is a diagram illustrating the configuration of an optical system of a projector in which an electro-optical display device according to a first embodiment of the invention is built.

This projector 10 includes: a light source device 21 that generates source light; a color separation light-guiding optical system 23 that separates the source light emitted from the light source device 21 into beams of three colors of blue, green, and red; an optical modulation unit 25 that is illuminated by illumination light of each color that is output from the color separation light-guiding optical system 23; a cross dichroic prism 27 that combines image light of each color that is output from the optical modulation unit 25; and a projection lens 29 that projects the image light that has passed through the cross dichroic prism 27 onto a screen (not shown).

The light source device 21 of the above-described projector 10 includes: a light source lamp 21a; a concave lens 21b; a pair of lens arrays 21d and 21e; a polarization converting member 21g; and a composite lens 21i. Of these components, the light source lamp 21a includes a lamp main body 22a that is, for example, a high-pressure mercury lamp and a concave mirror 22b that collects the source light and outputs the collected source light toward the front side. The concave lens 21b has a function of parallelizing the source light emitted from the light source lamp 21a. However, in a case where the concave mirror 22b is, for example, a paraboloidal mirror, the concave lens 21b may be omitted. One pair of the lens arrays 21d and 21e are respectively formed by a plurality of element lenses disposed in a matrix shape. The element lenses separate the source light transmitted from the light source lamp 21a through the concave lens 21b and individually collect and radiate the source light. The polarization converting member 21g, although detailed description thereof is omitted, includes a prism array in which a PBS and a mirror are built and a wavelength plate array that is attached to an outgoing face disposed on the prism array. This polarization converting member 21g converts the source light output from the lens array 21e, for example, into only linearly polarized light polarized in a first polarization direction that is parallel to the surface of FIG. 1 and supplies the polarized light to the next optical system. The composite lens 21i can illuminate colored liquid crystal light valves 25a, 25b, and 25c, which are disposed in the optical modulation unit 25, in an overlapping manner by allowing the illumination light that has passed through the polarization converting member 21g to appropriately converge as a whole. In other words, the illumination light that has passed through both the lens arrays 21d and 21e and the composite lens 21*i* uniformly illuminates colored liquid crystal units 26*a*, 26*b*, and 26*c* disposed in the optical modulation unit 25 through the color separation light-guiding optical system 23, to be described later in detail, in an overlapping manner.

The color separation light-guiding optical system 23 includes first and second dichroic mirrors 23*a* and 23*b*, field lenses 23*f*, 23*g*, and 23*h*, and reflective mirrors 23*j*, 23*m*, 23*n*, and 23*o*. The color separation light-guiding optical system 23 configures the illumination device together with the light source device 21. Here, the first dichroic mirror 23*a* transmits, for example, the blue (B) beam out of beams of three colors of blue, green, and red and reflects the green (G) beam and the red (R) beam. In addition, the second dichroic mirror 23*b* reflects, for example, the green (G) beam out of incident beams of two colors of green and red and transmits the red (R) beam. Accordingly, the B beam, the G beam, and the R beam configuring the source light are respectively guided by first, second, and third optical paths OP1, OP2, and OP3 so as to be incident to different illumination targets. Described in more detail, the source light transmitted from the light source device 21 has its optical path bent by the reflective mirror 23*j* and is incident to the first dichroic mirror 23*a*. The B beam that has passed through the first dichroic mirror 23*a* is incident to the field lens 23*f* facing the liquid crystal light valve 25*a* through the reflective mirror 23*m*. On the other hand, the G beam that is reflected by the first dichroic mirror 23*a* and is further reflected by the second dichroic mirror 23*b* is incident to the field lens 23*g* facing the liquid crystal light valve 25*b*. Furthermore, the R beam that has passed through the second dichroic mirror 23*b* is incident to the field lens 23*h* facing the liquid crystal light valve 25*c* through lenses LL1 and LL2 and the reflective mirrors 23*n* and 23*o*. In addition, each of the field lenses 23*f*, 23*g*, and 23*h* has a function of controlling the incidence angle of the illumination light that is incident to each of the liquid crystal light valves 25*a*, 25*b*, and 25*c*. The lenses LL1 and LL2 and the field lens 23*h* configure a relay optical system. This relay optical system has a function of delivering an image of the first lens LL1 to the field lens 23*h* through the second lens LL2 with little change.

The optical modulation unit 25 includes the three liquid crystal light valves 25*a*, 25*b*, and 25*c* in correspondence with the three optical paths OP1, OP2, and OP3 for the above-described colors. Each of the liquid crystal light valves 25*a*, 25*b*, and 25*c* is a non-emission type optical modulation device that modulates the spatial distribution of the intensity of the incident illumination light.

Here, the liquid crystal light valve 25*a* for the B color that is disposed in the first optical path OP1 includes: the liquid crystal unit 26*a* that is illuminated by the B beams; a first polarizing plate 25*e* as an incident-side polarizing plate disposed on the incident side of the liquid crystal unit 26*a*; and a second polarizing plate 25*h* as an outgoing-side polarizing plate disposed on the outgoing side of the liquid crystal unit 26*a*. This liquid crystal light valve 25*a* is disposed on the latter stage of the field lens 23*f* that is disposed in the color separation light-guiding optical system 23 and is uniformly illuminated by the B beams that are transmitted through the first dichroic mirror 23*a*. The first polarizing plate 25*e* of the liquid crystal light valve 25*a* selectively transmits linearly polarized light polarized in the first polarization direction that is parallel to the surface of the figure out of the incident B beams so as to be guided to the liquid crystal unit 26*a*. Here, the first polarization direction indicates a direction (an X-axis direction to be described later) that is perpendicular to a line of intersection of a first dichroic mirror 27*a* and a second dichroic mirror 27*b* of the cross dichroic prism 27. The liquid crystal unit 26*a* is an embodiment of an electro-optical display device. The liquid crystal unit 26*a* converts linearly polarized light, which is polarized in the first polarization direction, incident thereto into linearly polarized light polarized in a second polarization direction that is, for example, partially perpendicular to the surface of the figure in accordance with an image signal. The second polarization direction indicates a direction (a Y-axis direction to be described later) that is parallel to the line of intersection. The second polarizing plate 25*h* selectively transmits only linearly polarized light, which is polarized in the second polarization direction, modulated through the liquid crystal unit 26*a*.

The liquid crystal light valve 25*b* for the G color that is disposed in the second optical path OP2 includes: the liquid crystal unit 26*b* that is illuminated by the G beams; a first polarizing plate 25*f* as an incident-side polarizing plate disposed on the incident side of the liquid crystal unit 26*b*; a second polarizing plate 25*i* as an outgoing-side polarizing plate disposed on the outgoing side of the liquid crystal unit 26*a*; and a half-wavelength plate 25*p* that is disposed on the most outgoing side. This liquid crystal light valve 25*b* is disposed on the latter stage of the field lens 23*g* that is disposed in the color separation light-guiding optical system 23 and is uniformly illuminated by the G beams that are reflected by the second dichroic mirror 23*b*. The first polarizing plate 25*f* of the liquid crystal light valve 25*b* selectively transmits linearly polarized light polarized in the first polarization direction that is parallel to the surface of the figure out of the incident G beams so as to be guided to the liquid crystal unit 26*b*. The liquid crystal unit 26*b* is an embodiment of an electro-optical display device. The liquid crystal unit 26*b* converts linearly polarized light, which is polarized in the first polarization direction, incident thereto into linearly polarized light polarized in the second polarization direction that for example, partially perpendicular to the surface of the figure in accordance with an image signal. The second polarizing plate 25*i* selectively transmits only linearly polarized light, which is polarized in the second polarization direction, modulated through the liquid crystal unit 26*b*. The half-wavelength plate 25*p* rotates the polarized direction of the linearly polarized light, which is polarized in the second polarization direction, transmitted through the second polarization plate 25*i* by 90 degrees so as to be shifted to the linearly polarized light polarized in the first polarization direction that is parallel to the surface of the figure.

The liquid crystal light valve 25*c* for the R color that is disposed in the third optical path OP3 includes: the liquid crystal unit 26*c* that is illuminated by the R beams; a first polarizing plate 25*g* as an incident-side polarizing plate disposed on the incident side of the liquid crystal unit 26*c*; and a second polarizing plate 25*j* as an outgoing-side polarizing plate disposed on the outgoing side of the liquid crystal unit 26*a*. This liquid crystal light valve 25*c* is disposed on the latter stage of the field lens 23*h* that is disposed in the color separation light-guiding optical system 23 and is uniformly illuminated by the R beams that are transmitted through the second dichroic mirror 23*b*. The first polarizing plate 25*g* of the liquid crystal light valve 25*c* selectively transmits linearly polarized light polarized in the first polarization direction that is parallel to the surface of the figure out of the incident R beams so as to be guided to the liquid crystal unit 26*c*. The liquid crystal unit 26*c* is an embodiment of an electro-optical display device. The liquid crystal unit 26*c* converts linearly polarized light, which is polarized in the first polarization direction, incident thereto into linearly polarized light polarized in the second polarization direction that is, for example, partially perpendicular to the surface of the figure in accordance with an image signal. The second polarizing plate 25*j* selectively transmits only linearly polarized light, which is polarized in the second polarization direction, modulated through the liquid crystal unit 26*c*.

Figure 2:
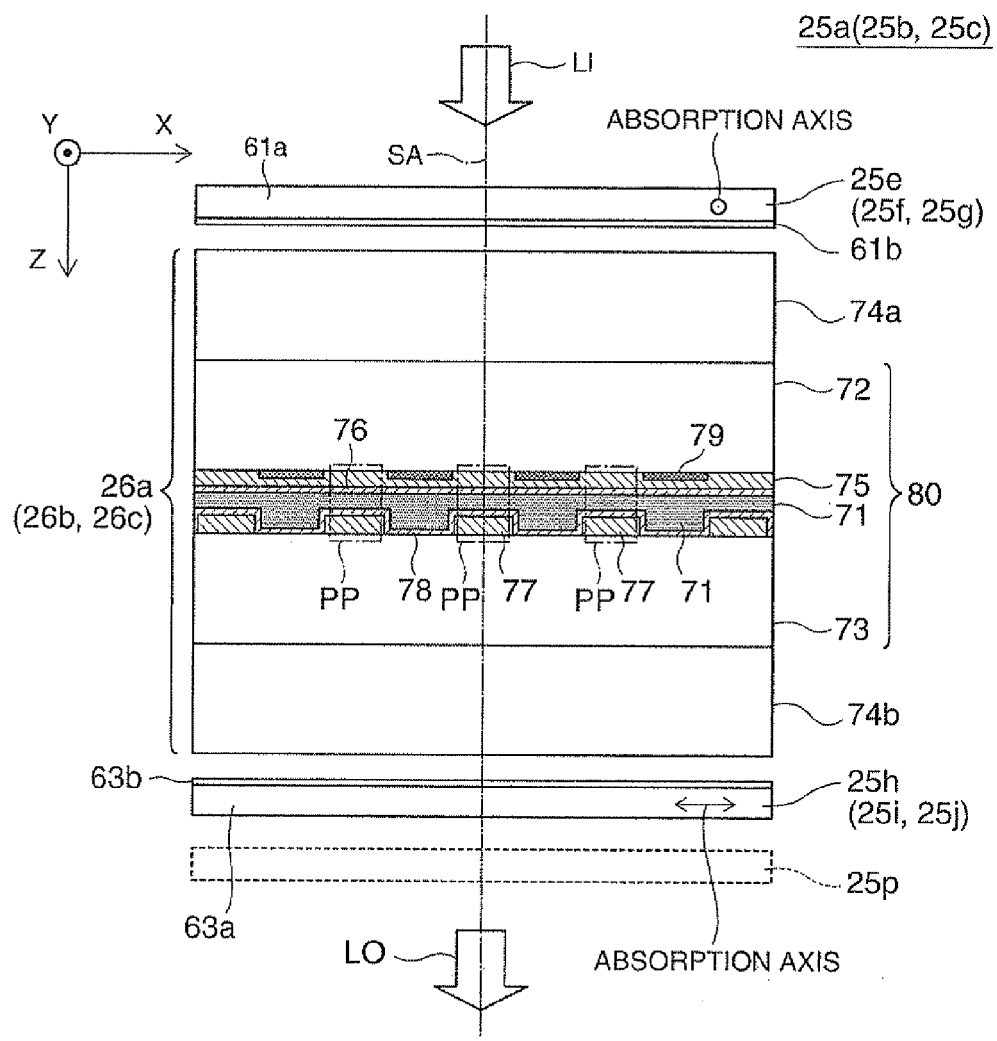
FIG. 2 is an enlarged cross-sectional view of a liquid crystal light valve for B beams and the like that configure the projector shown in FIG. 1.
Figure 3:
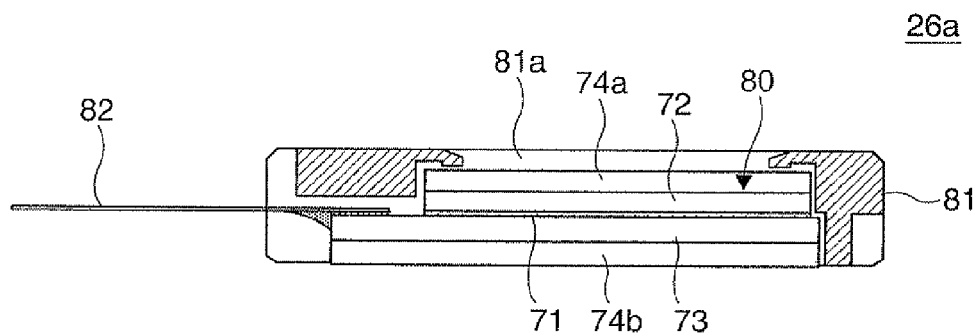
FIG. 3 is a side cross-sectional view of the liquid crystal unit of the liquid crystal light valve shown in FIG. 2.

FIG. 2 is an enlarged cross-sectional view illustrating a detailed structure of the liquid crystal light valve 25*a* for B beams and the like that configure the optical modulation unit 25 of the projector 10 shown in FIG. 1. FIG. 3 is a cross-sectional view illustrating the structure of the liquid crystal unit 26*a* and the like that configure the liquid crystal light valve 25*a* shown in FIG. 2 and the like.

As shown in FIG. 2, in the liquid crystal light valve 25*a*, one pair of the polarizing plates 25*e* and 25*h* are disposed so as to face each other with the liquid crystal unit 26*a* interposed therebetween and configure a cross Nicol. In the figure, a Z-axis direction corresponds to a direction in which a system optical axis SA extends. In addition, the X direction corresponds to a direction that is perpendicular to a line of intersection of the first and second dichroic mirrors 27*a* and 27*b* of the cross dichroic prism 27 and the Z axis. The Y direction corresponds to a direction that is parallel to the line of intersection of the first and second dichroic mirrors 27*a* and 27*b*.

In the liquid crystal light valve 25*a*, the first polarizing plate 25*e* that is disposed on the incident side has a normal line of the incident and outgoing faces to be parallel to the system optical axis SA, that is, the Z axis. The first polarizing plate 25*e*, for example, is formed by attaching a polarizing film 61*b* made of resin on a light-transmissive substrate 61*a* made of silica glass. Thus, the polarizing film 61*b* passes only P-polarized light polarized in the first polarization direction along the X direction. In other words, the absorption axis of the first polarizing plate 25*e* extends in the Y direction. In addition, the light-transmissive substrate 61*a* is disposed on the outer side of the polarizing film 61*b* and does not influence the state of luminous flux after passing through the polarizing film 61*b*.

On the other hand, the second polarizing plate 25*h* that is disposed on the outgoing side has a normal line of the incident and outgoing faces to be parallel to the system optical axis SA, that is, the Z axis. The second polarizing plate 25*h*, for example, is formed by attaching a polarizing film 63*b* made of resin on an light-transmissive substrate 63*a* made of silica glass. Thus, the polarizing film 63*b* passes only S-polarized light polarized in the second polarization direction along the Y direction and eliminates the P-polarized light (non-modulated light) by absorbing it or the like. In other words, the absorption axis of the second polarizing plate 25*h* extends in the X direction. In addition, the light-transmissive substrate 63*a* is disposed on the outer side of the polarizing film 63*b* and does not influence the state of luminous flux before passing through the polarizing film 63*b*.

The liquid crystal unit 26*a* that is interposed between the first and second polarizing plates 25*e* and 25*h* partially changes an incident light LI incident from the first polarizing plate 25*e* side from the P-polarized light to the S polarized light in units of pixels in accordance with an input signal and outputs modulated light after the change to the second polarizing plate 25*h* side as an outgoing light LO. As described above, the modulated light output from the liquid crystal light valve 25*a* is the outgoing light LO that is in the S-polarized state appropriate for light composition in the cross dichroic prism 27 to be described later.

A liquid crystal panel 80 has an opposing substrate 72 on the incident side and a driving substrate 73 on the outgoing side with a liquid crystal layer 71, which is configured, for example, by a liquid crystal operating, in a vertical alignment mode (that is, a vertically-aligned liquid crystal), interposed therebetween. The opposing substrate 72 and the driving substrate 73 have a flat-plate shape and, similarly to the first polarizing plate 25*e* and the like, have a normal line of the incident and outgoing faces disposed parallel to the system optical axis SA, that is, the Z axis. On the light-incident side of the liquid crystal panel 80, that is, the outer side of the opposing substrate 72, an incident-side dust-protective substrate 74*a* as a second light-transmissive substrate is attached. In addition, on the light outgoing side of the liquid crystal panel 80, that is, the outer side of the driving substrate 73, an outgoing-side dust-protective substrate 74*b* as a first light-transmissive substrate is attached. The above-described dust-protective substrates 74*a* and 74*b* have a flat-plate shape and, similarly to the first polarizing plate 25*e* and the like, have a normal line of the incident and outgoing faces disposed parallel to the system optical axis SA, that is, the Z axis.

As shown in FIG. 3, in the liquid crystal unit 26*a* as an electro-optical display device, one pair of the substrates 72 and 73 fixed with the liquid crystal layer interposed therebetween and one pair of the dust-protective substrates 74*a* and 74*b* attached to the outer sides thereof are held in a frame 81 in which a window 81*a* is disposed. A flexible cable 82 is connected to an end portion of the driving substrate 73, so that an external electric signal can be input to the driving substrate 73. A portion acquired by excluding one pair of the dust-protective substrates 74*a* and 74*b* from the liquid crystal unit 26*a* forms the liquid crystal panel 80 as a main body.

Referring back to FIG. 2, in the liquid crystal panel 80, on a face of the opposing substrate 72 that is disposed on the liquid crystal layer 71 side, a transparent common electrode 75 is disposed. In addition, on the common electrode 75, for example, an alignment film 76 is formed. On the other hand, on a face of the driving substrate 73 that is disposed on the liquid crystal layer 71 side, a plurality of transparent pixel electrodes 77 as display electrodes disposed in a matrix shape and wirings (not shown) that can be respectively connected electrically to the transparent pixel electrodes 77, and a thin film transistor (not shown) that is interposed between the transparent pixel electrode 77 and the wiring are disposed. In addition, on the transparent pixel electrode 77, for example, an alignment film 78 is formed. The liquid crystal panel 80 serves as an optical active device for modulating the polarization state of the incident light LI in accordance with an input signal.

Each pixel portion PP that configures the liquid crystal panel 80 includes one transparent pixel electrode 77, a portion of the common electrode 75, portions of two alignment films 76 and 78, and a portion of the liquid crystal layer 71. In addition, between the opposing substrate 72 and the common electrode 75, black matrixes 79 having a matrix shape are disposed so as to partition each pixel portion PP.

In the above-described liquid crystal panel 80, the alignment films 76 and 78 have a function of arranging liquid crystal compounds configuring the liquid crystal layer 71 to be approximately parallel to the system optical axis SA, that is, the Z axis in the state in which an electric field is not formed. However, in a case where an appropriate electric field is formed in the direction along the Z axis, the liquid crystal compounds configuring the liquid crystal layer 71 are tilted, for example, toward a predetermined azimuth within the XY plane from the state being approximately parallel to the system optical axis SA, that is, the Z axis. Accordingly, the liquid crystal layer 71 interposed between one pair of the polarizing plates 25*e* and 25*h* is operated in a normally-black mode. Therefore, a maximum light-shielding state (light-off state) can be acquired in the off-state in which a voltage is not applied. In other words, the liquid crystal panel 80, that is, the liquid crystal unit 26a allows the P-polarized light to pass through without any change at the time of black display of the light-off state. In addition, the liquid crystal panel 80, that is, the liquid crystal unit 26a changes the P-polarized light into the S-polarized light so as to allow it to pass through at the time of white display of a light-on state.

Figure 4:
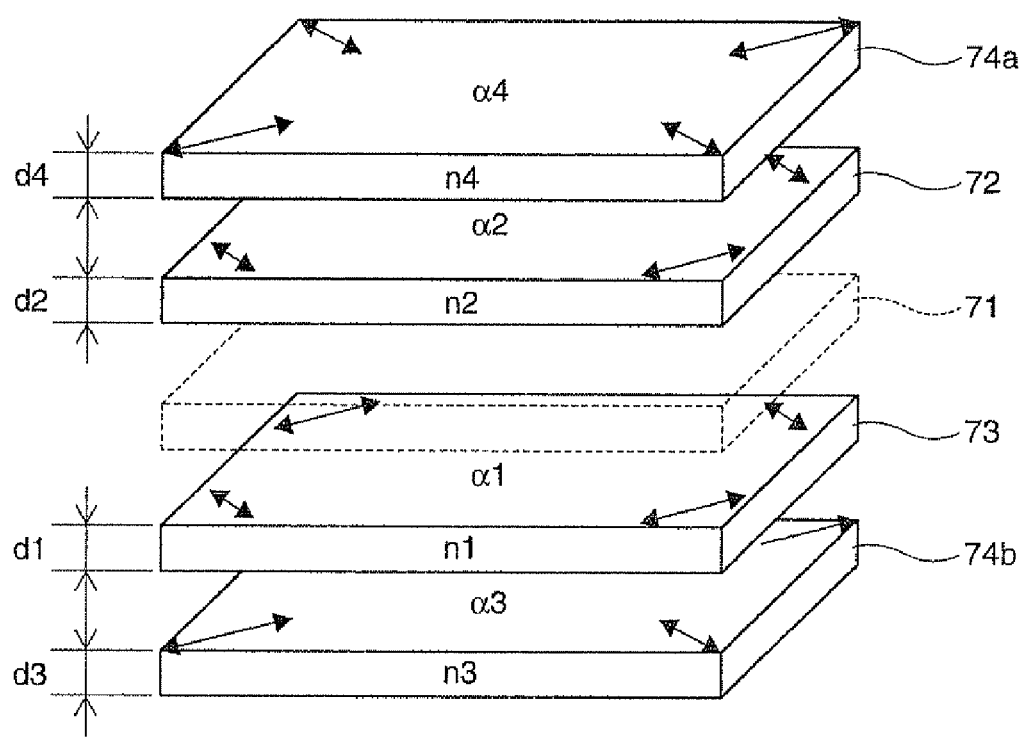
FIG. 4 is a perspective view illustrating the materials, the states, and the like of a plurality of element substrates configuring the liquid crystal unit.

FIG. 4 is a perspective view illustrating the materials, the states, and the like of a plurality of element substrates, which have optical transparency, configuring the liquid crystal unit 26a, and more particularly, the driving substrate 73, the opposing substrate 72, the outgoing-side dust-protective substrate 74b, and the incident-side dust-protective substrate 74a. In this case, materials are selected such that one of the thermal expansion coefficients of the driving substrate 73 and the outgoing-side dust-protective substrate 74b is negative, and the other is positive. As materials having negative thermal expansion coefficients, for example, there are Neoceram (registered trademark) N-0 having the average linear expansion coefficient of $-5.5 \times 10^{-7}$ [/K] and the like. In addition, as materials having positive thermal expansion coefficients, for example, there are silica glass having the average linear expansion coefficient of $5.5 \times 10^{-7}$ [/K], 7971 titanium silicate glass, which has the average linear expansion coefficient of $0.3 \times 10^{-7}$ [/K], manufactured by Coning Incorporated, Pyrex (registered trademark) having the average linear expansion coefficient of $32.5 \times 10^{-7}$ [/K], 7913 95% silicate glass, which has the average linear expansion coefficient of $7.5 \times 10^{-7}$ [/K], manufactured by Coning Incorporated, sapphire glass having the average linear expansion coefficient of $53 \times 10^{-7}$ [/K], whiteboard glass having the average linear expansion coefficient of $93 \times 10^{-7}$ [/K], and the like. In particular, the driving substrate 73 is formed from silica glass having a positive thermal expansion coefficient or the like, and the outgoing-side dust-protective substrate 74b is formed from Neoceram (registered trademark) having a negative thermal expansion coefficient, or the like. In addition, the opposing substrate 72 is formed from silica glass having a positive thermal expansion coefficient or the like, and the incident-side dust-protective substrate 74a is formed from Neoceram (registered trademark) having a negative thermal expansion coefficient or the like.

Figure 5A:
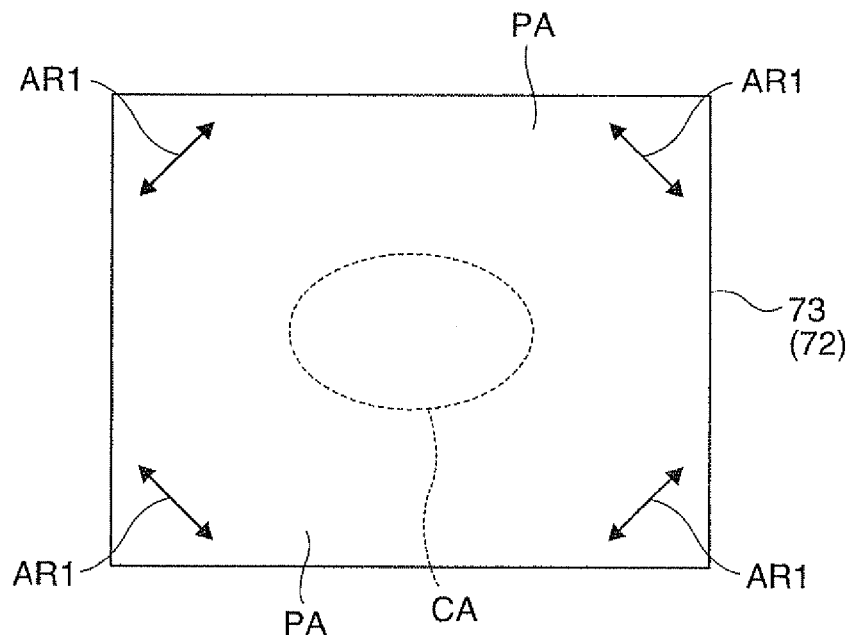
FIG. 5A is a diagram illustrating the operation state of a driving substrate.

FIG. 5A is a diagram illustrating the operation state of the driving substrate 73. When a display operation is performed by irradiating illumination light onto the liquid crystal light valve 25a, for example, a center area CA of the driving substrate 73 is heated, and the temperature of the center area CA is relatively higher than that of a peripheral area PA. In such a case, since the thermal expansion coefficient of the driving substrate 73 has a positive value, the center area CA expands. As a result, in the peripheral area PA, pressurized distortion occurs, and birefringence due to the distortion is formed. A slow axis AR1 due to the birefringence approximately follows the peripheral direction that is perpendicular to the radial direction extending from the center. Accordingly, particularly in portions of the four corners of the driving substrate 73, the slow axis AR1 is formed in the direction perpendicular to the diagonal direction.

Figure 5B:
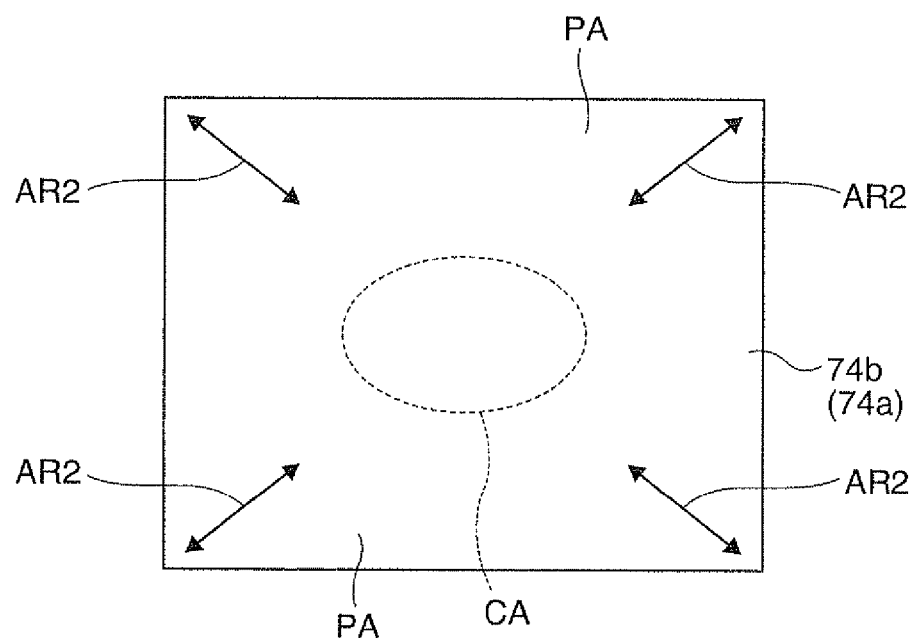
FIG. 5B is a diagram illustrating the operation state of an outgoing-side dust-protective substrate.

FIG. 5B is a diagram illustrating the operation state of the outgoing-side dust-protective substrate 74b. When a display operation is performed by irradiating illumination light onto the liquid crystal light valve 25a, for example, a center area CA of the outgoing-side dust-protective substrate 74b located adjacent to the driving substrate 73 is also heated, and the temperature of the center area CA is relatively higher than that of a peripheral area PA. In such a case, since the thermal expansion coefficient of the outgoing-side dust-protective substrate 74b has a negative value, the center area CA contracts. As a result, in the peripheral area PA, pulling distortion occurs, and birefringence due to the distortion is formed. A slow axis AR2 due to the birefringence approximately follows the radial direction extending from the center. Accordingly, particularly in portions of the four corners of the outgoing-side dust-protective substrate 74b corresponding to the four corners of the driving substrate 73, the slow axis AR2 is formed in the diagonal direction.

Similarly, during the display operation, for example, a center area CA of the opposing substrate 72 shown in FIG. 5A is also heated, and the temperature of the center area CA is relatively higher than that of a peripheral area PA. In such a case, since the thermal expansion coefficient of the opposing substrate 72 has a positive value, the center area CA expands. As a result, in the peripheral area PA, pressurized distortion occurs, and birefringence due to the distortion is formed. A slow axis AR1 due to the birefringence approximately follows the peripheral direction that is perpendicular to the radial direction extending from the center. Accordingly, particularly in portions of the four corners of the opposing substrate 72 corresponding to the four corners of the driving substrate 73, the slow axis AR1 is formed in the direction perpendicular to the diagonal direction.

In addition, during the display operation, for example, a center area CA of the incident-side dust-protective substrate 74a shown in FIG. 5B is also heated, and the temperature of the center area CA is relatively higher than that of a peripheral area PA. In such a case, since the thermal expansion coefficient of the incident-side dust-protective substrate 74a has a negative value, the center area CA contracts. As a result, in the peripheral area PA, pulling distortion occurs, and birefringence due to the distortion is formed. A slow axis AR2 due to the birefringence approximately follows the radial direction extending from the center. Accordingly, particularly in portions of the four corners of the incident-side dust-protective substrate 74a corresponding to the four corners of the opposing substrate 72, the slow axis AR2 is formed in the diagonal direction.

Here, the slow axis AR1 of the driving substrate 73 and the slow axis AR2 of the outgoing-side dust-protective substrate 74b are approximately perpendicular to each other. Accordingly, an unintended phase difference generated by the driving substrate 73 tends to be offset by an unintended phase difference generated by the outgoing-side dust-protective substrate 74b. In particular, by having the magnitude of the phase difference generated by the driving substrate 73 and the magnitude of the phase difference generated by the outgoing-side dust-protective substrate 74b approximately coincide with each other, a phenomenon in which polarization is disturbed at a time when light passes through the driving substrate 73 and the outgoing-side dust-protective substrate 74b can be reduced. Accordingly, polarized light having a desired state can be output from the liquid crystal layer 71. Therefore, the phase modulation, which is performed by the liquid crystal unit 26a, can be appropriately performed. Accordingly, the modulated light of the B color that is output from the liquid crystal light valve 25a can have a precise distribution of illuminance. In particular, at the time of black display when the liquid crystal light valve 25a is in the light-off state, leakage of light on either the center of an image or the periphery thereof can be decreased. Accordingly, display unevenness of the liquid crystal light valve 25a can be decreased.

Similarly, the slow axis AR1 of the opposing substrate 72 and the slow axis AR2 of the incident-side dust-protective substrate 74a are approximately perpendicular to each other. Accordingly, an unintended phase difference generated by the incident-side dust-protective substrate 74a tends to be offset by an unintended phase difference generated by the opposing substrate 72. In particular, by having the magnitude of the phase difference generated by the opposing substrate 72 and the magnitude of the phase difference generated by the incident-side dust-protective substrate 74a approximately coincide with each other, a phenomenon in which polarized light is disturbed at a time when light passes through the opposing substrate 72 and the incident-side dust-protective substrate 74a can be reduced. Accordingly, polarized light having a desired state can be input to the liquid crystal layer 71. Therefore, the phase modulation, which is performed by the liquid crystal unit 26a, can be appropriately performed. Accordingly, the modulated light of the B color that is output from the liquid crystal light valve 25a can have a precise distribution of illuminance. In particular, at the time of black display when the liquid crystal light valve 25a is in the light-off state, leakage of light on either the center of an image or the periphery thereof can be decreased. Accordingly, display unevenness of the liquid crystal light valve 25a can be decreased.

The case where the temperature of the center areas CA of the driving substrate 73, the opposing substrate 72, the outgoing-side dust-protective substrate 74b, and the incident-side dust-protective substrate 74a rises has been described. However, the center areas CA do not need to be at a high temperature as long as a common distribution of temperature is formed in the element substrates 73, 72, 74b, and 74a.

In addition, the case where the phase difference between the driving substrate 73 and the outgoing-side dust-protective substrate 74b is offset or the case where the phase difference between the opposing substrate 72 and the incident-side dust-protective substrate 74a is offset has been described. However, display unevenness of the liquid crystal light valve 25a can be decreased by offsetting the phase difference by balancing the total four element substrates configuring the liquid crystal unit 26a, in particular, the driving substrate 73, the opposing substrate 72, the outgoing-side dust-protective substrate 74b, and the incident-side dust-protective substrate 74a.

In other words, at the time of black display when the liquid crystal light valve 25a is in the light-off state, the liquid crystal layer 71 just passes the modulated light as it is, and accordingly, display unevenness of the liquid crystal light valve 25a can be decreased by decreasing the phase difference that is generated by the driving substrate 73, the opposing substrate 72, the outgoing-side dust-protective substrate 74b, and the incident-side dust-protective substrate 74a as a whole.

Figure 6A:
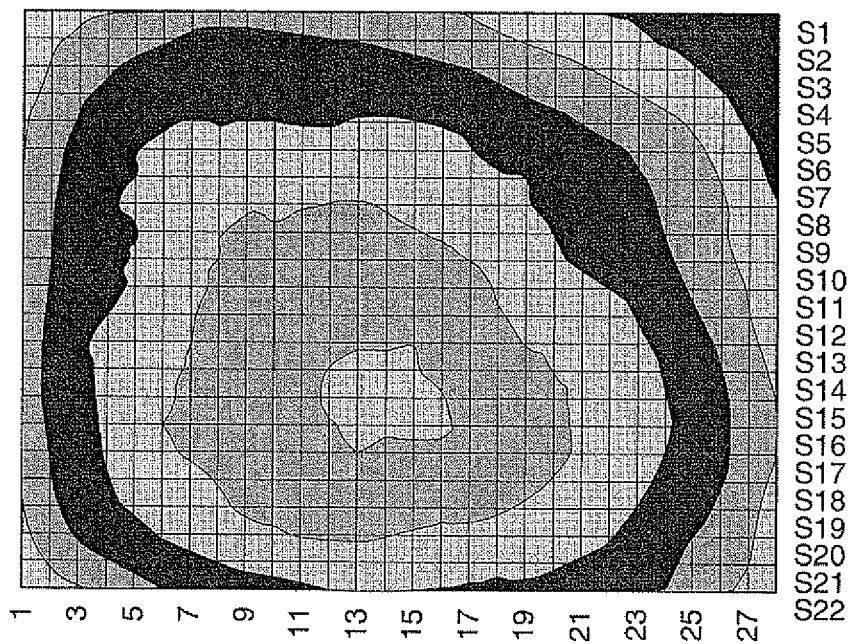
FIG. 6A represents the illuminance distribution of a projection image projected by a liquid crystal light valve according to an example.
Figure 6B:
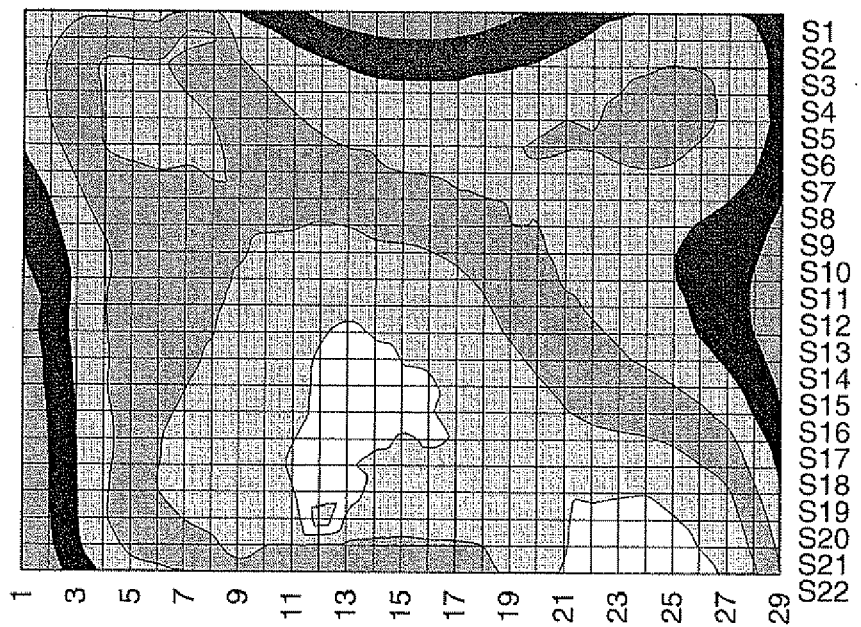
FIG. 6B represents the illuminance distribution of a projection image projected by a liquid crystal light valve according to a comparative example.

FIG. 6A represents an illuminance distribution on a screen when the liquid crystal light valve 25a and the like of Example 1, to be described later, are in the light-shielding state. FIG. 6B represents an illuminance distribution on the screen when a liquid crystal light valve of a comparative example in which all the element substrates 73, 72, 74b, and 74a are made from quartz is in the light-shielding state. As is apparent from both figures, a relatively flat illuminance distribution is acquired by the liquid crystal light valve 25a and the like of Example 1, and display unevenness can be described as being relatively small. However, an illuminance distribution that is biased in the diagonal direction and the like is generated by the liquid crystal light valve of the comparative example, and display unevenness can be described as being relatively large.

Hereinafter, concrete specifications of Example 1 will be described. In Example 1, the refractive indices, the thicknesses, and the thermal expansion coefficients of the driving substrate 73, the opposing substrate 72, the outgoing-side dust-protective substrate 74b, and the incident-side dust-protective substrate 74a that configure the liquid crystal light valve 25a or the like were appropriately set, and evaluation of display unevenness was performed. In the following Table 1, data of Example 1 and data of the comparative example are compared with each other. In the comparative example, all the element substrates 73, 72, 74b, and 74a are made of quartz. Other Examples 2 to 8 will be described later.

TABLE 1

| | | | Comparative Example | Example 1 | Example 2 | Example 3 | Example 4 |
|---|---|---|---|---|---|---|---|
| Driving substrate | Material | | quartz | quartz | Neoceram | Neoceram | quartz |
| | Average linear expansion coefficient | $\alpha 1 \times 10^{-7}/k$ | 5.5 | 5.5 | −6 | −6 | 5.5 |
| | Thickness | d1 mm | 1.1 | 1.1 | 1.1 | 1 | 1.1 |
| | Refractive index | n1 | 1.541 | 1.459 | 1.541 | 1.541 | 1.459 |
| Opposing substrate | Material | | quartz | quartz | Neoceram | Neoceram | Neoceram |
| | Average linear expansion coefficient | $\alpha 2 \times 10^{-7}/k$ | 5.5 | 5.5 | −6 | −6 | −6 |
| | Thickness | d2 mm | 1.1 | 1.1 | 1.1 | 1 | 1 |
| | Refractive index | n2 | 1.541 | 1.459 | 1.541 | 1.541 | 1.541 |
| Outgoing-side dust-protective substrate | Material | | quartz | Neoceram | quartz | quartz | Neoceram |
| | Average linear expansion coefficient | $\alpha 3 \times 10^{-7}/k$ | 5.5 | −6 | 5.5 | 5.5 | −6 |
| | Thickness | d3 mm | 1.1 | 1.1 | 1.1 | 1.1 | 1 |
| | Refractive index | n3 | 1.459 | 1.541 | 1.459 | 1.459 | 1.541 |
| Incident-side dust-protective substrate | Material | | quartz | Neoceram | quartz | quartz | quartz |
| | Average linear expansion coefficient | $\alpha 4 \times 10^{-7}/k$ | 5.5 | −6 | 5.5 | 5.5 | 5.5 |
| | Thickness | d4 mm | 1.1 | 1.1 | 1.1 | 1.1 | 1.1 |
| | Refractive index | n4 | 1.459 | 1.541 | 1.459 | 1.459 | 1.459 |
| $d1 \cdot \alpha 1 + d2 \cdot \alpha 2 + d3 \cdot \alpha 3 + d4 \cdot \alpha 4$ | | $\times 10^{-7}$ mm/k | 24.2 | −1.1 | −1.1 | 0.1 | 0.1 |
| $n1 \cdot d1 \cdot \alpha 1 + n2 \cdot d2 \cdot \alpha 2 + n3 \cdot d3 \cdot \alpha 3 + n4 \cdot d4 \cdot \alpha 4$ | | $\times 10^{-7}$ mm/k | 36.3 | −2.7 | −2.7 | −0.8 | −0.8 |
| Display unevenness | | | bad | good | good | excellent | good |
| $d1 \cdot \alpha 1$ | | | 6.05 | 6.05 | −6.60 | −6.00 | 6.05 |
| $d2 \cdot \alpha 2$ | | | 6.05 | 6.05 | −6.60 | −6.00 | −6.00 |
| $d3 \cdot \alpha 3$ | | | 6.05 | −6.60 | 6.05 | 6.05 | −6.00 |
| $d4 \cdot \alpha 4$ | | | 6.05 | −6.60 | 6.05 | 6.05 | 6.05 |
| Absolute value of minimum value | | |pm| | 6.05 | 6.60 | 6.60 | 6.00 | 6.00 |

TABLE 1-continued

| | | | | | | | |
|---|---|---|---|---|---|---|---|
| Absolute value of maximum value | |pp| | 6.05 | 6.05 | 6.05 | 6.05 | 6.05 |
| Difference between absolute value of minimum value and absolute value of maximum value | |dm| | 0.00 | 0.55 | 0.55 | 0.05 | 0.05 |

| | | | | Example 5 | Example 6 | Example 7 | Example 8 |
|---|---|---|---|---|---|---|---|
| Driving substrate | Material | | | Neoceram | Neoceram | Neoceram | Neoceram |
| | Average linear expansion coefficient | α1 | ×10⁻⁷/k | −6 | −6 | −6 | −6 |
| | Thickness | d1 | mm | 1.1 | 1.1 | 1.1 | 1.7 |
| | Refractive index | n1 | | 1.541 | 1.541 | 1.541 | 1.541 |
| Opposing substrate | Material | | | Neoceram | quartz | quartz | Neoceram |
| | Average linear expansion coefficient | α2 | ×10⁻⁷/k | −6 | 5.5 | 5.5 | −6 |
| | Thickness | d2 | mm | 1.1 | 1.1 | 1.1 | 1.7 |
| | Refractive index | n2 | | 1.541 | 1.459 | 1.459 | 1.541 |
| Outgoing-side dust-protective substrate | Material | | | quartz | quartz | Neoceram | Pyrex |
| | Average linear expansion coefficient | α3 | ×10⁻⁷/k | 5.5 | 5.5 | −6 | 32.5 |
| | Thickness | d3 | mm | 0.8 | 1.1 | 1.1 | 0.55 |
| | Refractive index | n3 | | 1.459 | 1.459 | 1.541 | 1.474 |
| Incident-side dust-protective substrate | Material | | | quartz | quartz | Neoceram | Pyrex |
| | Average linear expansion coefficient | α4 | ×10⁻⁷/k | 5.5 | 5.5 | −6 | 32.5 |
| | Thickness | d4 | mm | 0.8 | 1.1 | 1.1 | 0.55 |
| | Refractive index | n4 | | 1.459 | 1.459 | 1.541 | 1.474 |
| d1·α1 + d2·α2 + d3·α3 + d4·α4 | | | ×10⁻⁷mm/k | −4.4 | 11.6 | −13.8 | 15.4 |
| n1·d1·α1 + n2·d2·α2 + n3·d3·α3 + n4·d4·α4 | | | ×10⁻⁷mm/k | −7.5 | 16.3 | −21.7 | 21.3 |
| Display unevenness | | | | good | not bad | allowed range | allowed range |
| d1·α1 | | | | −6.60 | −6.60 | −6.60 | −10.20 |
| d2·α2 | | | | −6.60 | 6.05 | 6.05 | −10.20 |
| d3·α3 | | | | 4.40 | 6.05 | −6.60 | 17.88 |
| d4·α4 | | | | 4.40 | 6.05 | −6.60 | 17.88 |
| Absolute value of minimum value | | |pm| | 6.60 | 6.60 | 6.60 | 10.20 |
| Absolute value of maximum value | | |pp| | 4.40 | 6.05 | 6.05 | 17.88 |
| Difference between absolute value of minimum value and absolute value of maximum value | | |dm| | 2.20 | 0.55 | 0.55 | 7.68 |

As is apparent from Table 1, it can be seen that the display unevenness is suppressed to some degree so as not to cause any problem in Example 1.

In order to decrease the phase difference generated by the driving substrate 73, the opposing substrate 72, the outgoing-side dust-protective substrate 74b, and the incident-side dust-protective substrate 74a as a whole, first, the thermal expansion coefficients of the driving substrate 73, the opposing substrate 72, the outgoing-side dust-protective substrate 74b, and the incident-side dust-protective substrate 74a are assumed to be $\alpha_1$, $\alpha_2$, $\alpha_3$, and $\alpha_4$, respectively. In addition, the refractive indices of the driving substrate 73, the opposing substrate 72, the outgoing-side dust-protective substrate 74b, and the incident-side dust-protective substrate 74a are assumed to be n1, n2, n3, and n4, respectively, and the thickness values of the driving substrate 73, the opposing substrate 72, the outgoing-side dust-protective substrate 74b, and the incident-side dust-protective substrate 74a are assumed to be d1, d2, d3, and d4, respectively. Here, as the thermal expansion coefficients, average linear expansion coefficients of materials of the four element substrates 73, 72, 74b, and 74a can be used. The refractive indices n1 to n4 are set to be within the range of 1.5±0.1. In addition, a value C1 of a product-sum operation relating to the thicknesses and the thermal expansion coefficients of the four element substrates 73, 72, 74b, and 74a is acquired by using Equation (1).

$$C1 = d1 \cdot \alpha 1 + d2 \cdot \alpha 2 + d3 \cdot \alpha 3 + d4 \cdot \alpha 4 \quad (1)$$

Then, the thicknesses and the thermal expansion coefficients are set such that the value of C1 is within the range of 0±17×10⁻⁷ [mm/K]. In such a case, an unintended phase difference given to the luminous flux passing through the four element substrates 73, 72, 74b, and 74a can be decreased in consideration of the thicknesses and the thermal expansion coefficients.

In addition, by acquiring the value C1 of the product-sum operation relating to the thicknesses and the thermal expansion coefficients of the four element substrates 73, 72, 74b, and 74a and setting the thicknesses and the thermal expansion coefficients such that the value of C1=d1·α1+d2·α2+d3·α3+d4·α4 is within the range of 0±6×10⁻⁷ [mm/K], the occurrence of the phase difference can be further suppressed.

In the above-described case, the range limitation in which the refractive indices of the four element substrates 73, 72, 74b, and 74a are additionally used is not applied. However, by including the refractive indices, more precise range limitation can be applied. In other words, a value C2 of a product-sum operation relating to the refractive indices, the thicknesses, and the thermal expansion coefficients of the four element substrates 73, 72, 74b, and 74a is acquired by using Equation (2).

$$C2 = n1 \cdot d1 \cdot \alpha 1 + n2 \cdot d2 \cdot \alpha 2 + n3 \cdot d3 \cdot \alpha 3 + n4 \cdot d4 \cdot \alpha 4 \quad (2)$$

The refractive indices, the thicknesses, and the thermal expansion coefficients are set such that the value of C2 is within the range of 0±24×10⁻⁷ [mm/K]. In such a case, an unintended phase difference given to the luminous flux passing through the four element substrates 73, 72, 74b, and 74a can be assuredly decreased in consideration of the refractive indices, the thicknesses, and the thermal expansion coefficients.

In addition, by acquiring the value C2 of the product-sum operation relating to the refractive indices, the thicknesses, and the thermal expansion coefficients of the four element substrates 73, 72, 74b, and 74a and setting the refractive indices, the thicknesses, and the thermal expansion coefficients such that the value of $C2=n1 \cdot d1 \cdot \alpha1+n2 \cdot d2 \cdot \alpha2+n3 \cdot d3 \cdot \alpha3+n4 \cdot d4 \cdot \alpha4$ is within the range of $0 \pm 9 \times 10^{-7}$ [mm/K], the occurrence of the phase difference can be further suppressed.

In a case where the thermal expansion coefficients of the driving substrate 73, the opposing substrate 72, the outgoing-side dust-protective substrate 74b, and the incident-side dust-protective substrate 74a that are built in the liquid crystal unit 26a are $\alpha1$, $\alpha2$, $\alpha3$, and $\alpha4$, respectively, the thickness values of the driving substrate 73, the opposing substrate 72, the outgoing-side dust-protective substrate 74b, and the incident-side dust-protective substrate 74a are d1, d2, d3, and d4, respectively, and the absolute values of a maximum value and a minimum value of the respective product-sum operation values $d1 \cdot \alpha1$, $d2 \cdot \alpha2$, $d3 \cdot \alpha3$, and $d4 \cdot \alpha4$ of the thickness and the thermal expansion coefficient are equal to or greater than $3 \times 10^{-7}$ [mm/K], a phase difference is given to the luminous flux passing through each of the element substrates. However, by setting one or more of the values of the thermal expansion coefficients of a plurality of element substrates including at least the driving substrate 73, the opposing substrate 72, the outgoing-side dust-protective substrate 74b, and the incident-side dust-protective substrate 74a to be negative and one or more of the values of the thermal expansion coefficients of the plurality of the element substrates to be positive, the phase difference given to the luminous flux passing through the element substrates can be decreased.

In addition, in such a case, when the number of the element substrates such as the driving substrate 73, the opposing substrate 72, the outgoing-side dust-protective substrate 74b, and the incident-side dust-protective substrate 74a that are built in the liquid crystal unit 26a is equal to or greater than four and a positive maximum value is Pp, and a negative minimum value is Pm in a case where the products of thicknesses and thermal expansion coefficients of the element substrates are compared with each other, by allowing a difference DM of maximum values to satisfy the following condition of Equation (3), the display unevenness can be suppressed.

$$DM=|Pp|-|Pm| \leq 8 \times 10^{-7} \text{ [mm/K]} \quad (3)$$

In other words, by allowing the difference DM of the maximum values to have a relatively small value, the amount of a phase difference formed by the element substrate representing the positive maximum value Pp and the amount of a phase difference formed by the element substrate representing the negative minimum value Pm can be relatively balanced with each other, and thereby occurrence of the display unevenness can be suppressed.

Figure 7:
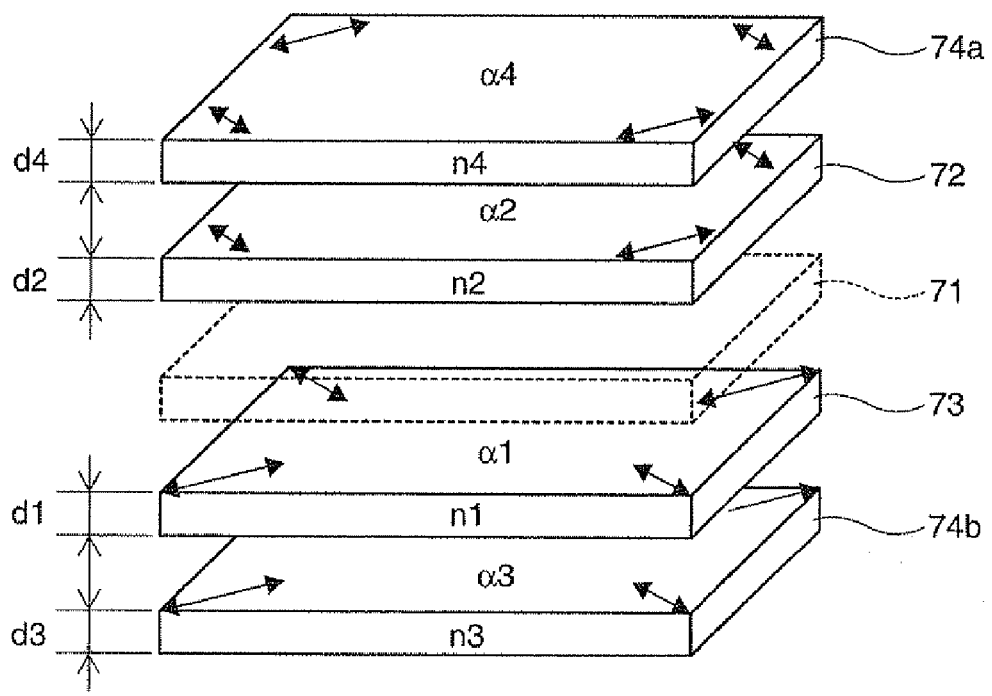
FIG. 7 is a perspective view illustrating a first modified example of the liquid crystal unit.

FIG. 7 is a perspective view illustrating a first modified example. In this liquid crystal unit 26a, the materials of the driving substrate 73 and the outgoing-side dust-protective substrate 74b are selected so as to have negative thermal expansion coefficients, and the materials of the opposing substrate 72 and the incident-side dust-protective substrate 74a are selected so as to have positive thermal expansion coefficients. Even in such a case, by allowing the above-described product-sum operation value C1 to be within the range of $0 \pm 17 \times 10^{-7}$ [mm/K], and preferably, to be within the range of $0 \pm 6 \times 10^{-7}$ [mm/K], the phase difference given to the luminous flux passing through the four element substrates 73, 72, 74b, and 74a can be decreased in consideration of the thicknesses and the thermal expansion coefficients. In addition, by allowing the above-described product-sum operation value C2 to be within the range of $0 \pm 24 \times 10^{-7}$ [mm/K], and preferably, to be within the range of $0 \pm 9 \times 10^{-7}$ [mm/K], the phase difference given to the luminous flux passing through the four element substrates 73, 72, 74b, and 74a can be assuredly decreased in consideration of the refractive indices, the thicknesses, and the thermal expansion coefficients.

In addition, in the description presented above, the thermal expansion coefficients of the driving substrate 73 and the outgoing-side dust-protective substrate 74b are configured to be negative, and the thermal expansion coefficients of the opposing substrate 72 and the incident-side dust-protective substrate 74a are configured to be positive. However, it may be configured that the thermal expansion coefficients of the driving substrate 73 and the outgoing-side dust-protective substrate 74b are positive, and the thermal expansion coefficients of the opposing substrate 72 and the incident-side dust-protective substrate 74a are negative. Furthermore, a combination in which the thermal expansion coefficients of the driving substrate 73 and the opposing substrate 72 are configured to be negative, and the thermal expansion coefficients of the outgoing-side dust-protective substrate 74b and the incident-side dust-protective substrate 74a are configured to be positive can be used. In other words, a configuration in which the thermal expansion coefficients of any two element substrates are negative and the thermal expansion coefficients of the remaining two element substrates are positive belongs to the first modified example except for a case where the thermal expansion coefficients of the driving substrate 73 and the opposing substrate 72 are positive which is shown in FIG. 4 as an example.

Figure 8A:
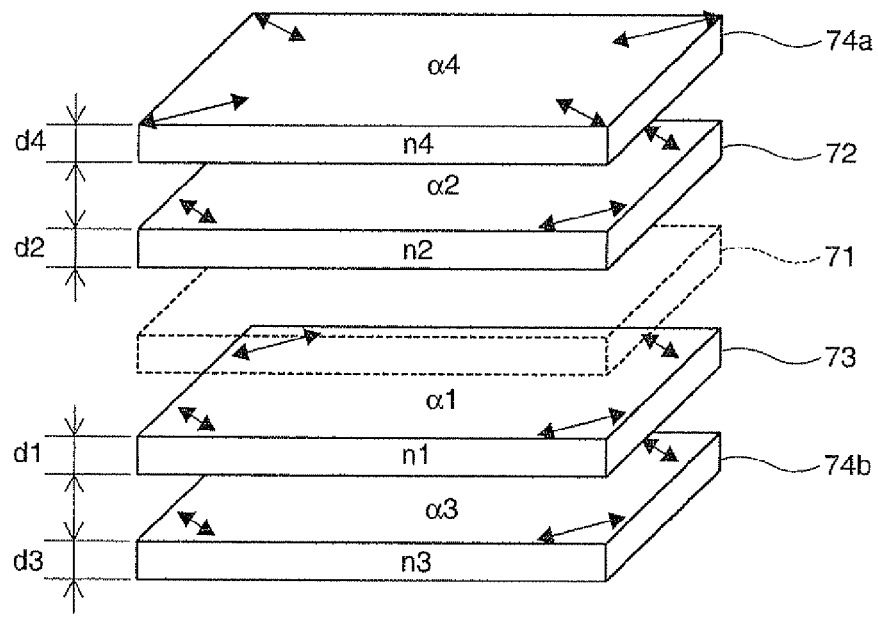
FIG. 8A is a perspective view illustrating a second modified example of the liquid crystal unit.

FIG. 8A is a perspective view illustrating a second modified example. In this liquid crystal unit 26a, the material of the incident-side dust-protective substrate 74a is selected so as to have a negative thermal expansion coefficient, and the materials of the remaining substrates including the driving substrate 73, the opposing substrate 72, and the outgoing-side dust-protective substrate 74b are selected so as to have positive thermal expansion coefficients. Even in such a case, by allowing the above-described product-sum operation value C1 to be within the range of $0 \pm 17 \times 10^{-7}$ [mm/K], and preferably, to be within the range of $0 \pm 6 \times 10^{-7}$ [mm/K], the phase difference given to the luminous flux passing through the four element substrates 73, 72, 74b, and 74a can be decreased in consideration of the thicknesses and the thermal expansion coefficients. In addition, by allowing the above-described product-sum operation value C2 to be within the range of $0 \pm 24 \times 10^{-7}$ [mm/K], and preferably, to be within the range of $0 \pm 9 \times 10^{-7}$ [mm/K], the phase difference given to the luminous flux passing through the four element substrates 73, 72, 74b, and 74a can be assuredly decreased in consideration of the refractive indices, the thicknesses, and the thermal expansion coefficients.

In addition, in the above-described modified example, the thermal expansion coefficient of the incident-side dust-protective substrate 74a is configured to be negative, and the thermal expansion coefficients of the remaining substrates 73, 72, and 74b are configured to be positive. However, it may be configured that the thermal expansion coefficient of any one of the driving substrate 73, the opposing substrate 72, and the outgoing-side dust-protective substrate 74b is negative, and the thermal expansion coefficients of the remaining substrates including the incident-side dust-protective substrate 74a are positive. Such a case also belongs to the second modified example. In other words, a case where the thermal expansion coefficient of any one element substrate is negative and the thermal expansion coefficients of the remaining three element substrates are positive belongs to the second modified example.

Figure 8B:
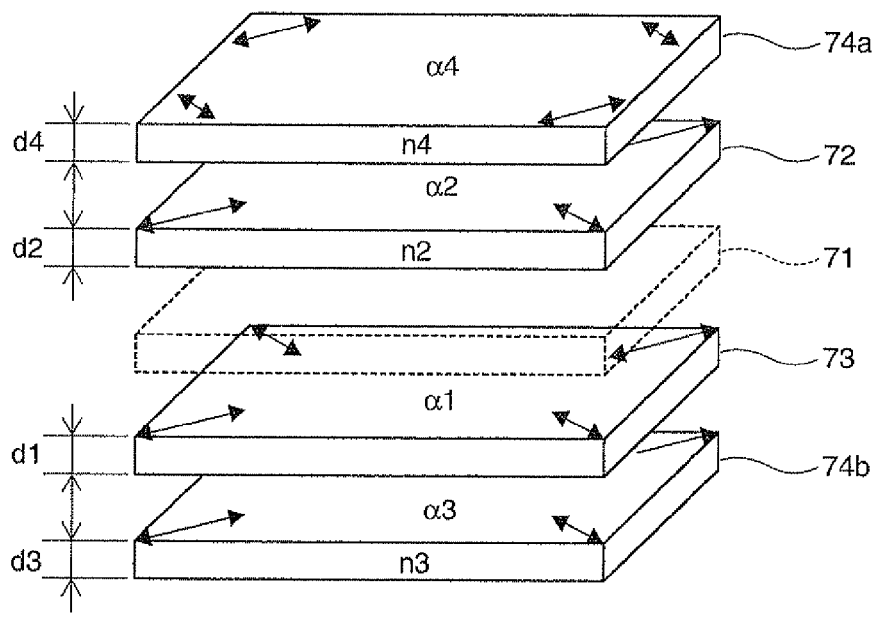
FIG. 8B is a perspective view illustrating a third modified example of the liquid crystal unit.

FIG. 8B is a perspective view illustrating a third modified example. In this liquid crystal unit 26a, the material of the incident-side dust-protective substrate 74a is selected so as to have a positive thermal expansion coefficient, and the materials of the remaining substrates including the driving substrate 73, the opposing substrate 72, and the outgoing-side dust-protective substrate 74b are selected so as to have negative thermal expansion coefficients. Even in such a case, by allowing the above-described product-sum operation value C1 to be within the range of $0\pm17\times10^{-7}$ [mm/K], and preferably, to be within the range of $0\pm6\times10^{-7}$ [mm/K], the phase difference given to the luminous flux passing through the four element substrates 73, 72, 74b, and 74a can be decreased in consideration of the thicknesses and the thermal expansion coefficients. In addition, by allowing the above-described product-sum operation value C2 to be within the range of $0\pm24\times10^{-7}$ [mm/K], and preferably, to be within the range of $0\pm9\times10^{-7}$ [mm/K], the phase difference given to the luminous flux passing through the four element substrates 73, 72, 74b, and 74a can be assuredly decreased in consideration of the refractive indices, the thicknesses, and the thermal expansion coefficients.

In addition, in the above-described modified example, the thermal expansion coefficient of the incident-side dust-protective substrate 74a is configured to be positive, and the thermal expansion coefficients of the remaining substrates 73, 72, and 74b are configured to be negative. However, it may be configured that the thermal expansion coefficient of any one of the driving substrate 73, the opposing substrate 72, and the outgoing-side dust-protective substrate 74b is positive, and the thermal expansion coefficients of the remaining substrates including the incident-side dust-protective substrate 74a are negative. Such a case also belongs to the third modified example. In other words, a case where the thermal expansion coefficients of any three element substrates are negative and the thermal expansion coefficient of the remaining one element substrate is positive belongs to the third modified example.

In the description presented above, the liquid crystal unit 26a is configured to include four element substrates, that is, the driving substrate 73, the opposing substrate 72, the outgoing-side dust-protective substrate 74b, and the incident-side dust-protective substrate 74a. However, the liquid crystal unit 26a may be configured to include five or more element substrates that are stacked together. Even in such a case, the above-described product-sum operation value C1 or a similar product-sum operation value C1' to be described below is configured to be within the range of $0\pm17\times10^{-7}$ [mm/K], and preferably, to be within the range of $0\pm6\times10^{-7}$ [mm/K]. In addition, the above-described product-sum operation value C2 or a similar product-sum operation value C2' to be described below is configured to be within the range of $0\pm24\times10^{-7}$ [mm/K], and preferably, to be within the range of $0\pm9\times10^{-7}$ [mm/K]. Hereinbefore, the product-sum operation value C1' is given in the following Equation (4).

$$C1'=\Sigma(dk\cdot\alpha k) \quad (4)$$

Here, dk is a thickness of each element substrate, $\alpha k$ is a thermal expansion coefficient of each element substrate, and k is a natural number increased from 1 to m (here, m is a total number of element substrates).

In addition, the product-sum operation value C2' is given in the following Equation (5).

$$C2'=\Sigma(nk\cdot dk\cdot\alpha k) \quad (5)$$

Here, nk is a refractive index of each element substrate, dk is a thickness of each element substrate, $\alpha k$ is a thermal expansion coefficient of each element substrate, and k is a natural number increased from 1 to m (here, m is a total number of element substrates).

Hereinafter, specifications of Examples 2 to 8 in which the first to third modified examples are embodied will be described. Similarly to the above-described Table 1, Examples 2 to 5 and 8 out of Examples 2 to 8 correspond to the first modified example shown in FIGS. 6A and 6B and the like. Example 6 corresponds to the second modified example shown in FIG. 7A and the like. In addition, Example 7 corresponds to the third modified example shown in FIG. 7B and the like. As is apparent from the table, it can be seen that the display unevenness is suppressed to some degree so as not to cause any problem in Examples 2 to 8. In particular, in the case of Example 8, although Pyrex (registered trademark) having a considerably high thermal expansion coefficient, compared to silica glass or the like, is used, the display unevenness is within the allowed range.

The structure and the function of the liquid crystal light valve 25a for the B beams have been described with reference to FIG. 2 and the like. However, the liquid crystal light valve 25c for the R beams has the structure and the function that are the same as those of the liquid crystal light valve 25a for the B beams. In other words, as shown in FIG. 2 and the like, only P-polarized light is selectively transmitted through the first polarizing plate 25g, the P-polarized light is modulated by the liquid crystal unit 26c so as to be converted into S-polarized light, and the modulated light output from the liquid crystal light valve 25c can be converted into outgoing light LO having the S-polarized state by the polarizing plate 25j. At this time, by appropriately setting the thicknesses, the thermal expansion coefficients, and the like of the element substrates 73, 72, 74b and 74a, which have optical transparency, configuring the liquid crystal unit 26c of the liquid crystal light valve 25c, the occurrence of an unintended phase difference is prevented. Accordingly, the occurrence of display unevenness can be suppressed.

The liquid crystal light valve 25b for G beams, as shown in FIG. 2 and the like, has the structure and the function that are basically the same as the liquid crystal light valve 25a for the B beams and the like. However, there is a difference in that the half-wavelength plate 25p is added to the light outgoing side in the liquid crystal light valve 25b for the G beams. Accordingly, only P-polarized light is selectively transmitted through the polarizing plate 25f and is modulated by the liquid crystal unit 26b so as to be converted into S-polarized light from the P-polarized light. Then, only the modulated light in the S-polarized state is transmitted through the polarizing plate 25i, and the modulated light output from the liquid crystal light valve 25b can be converted into outgoing light LO that is in the P-polarized state by the half-wavelength plate 25p. At this time, by appropriately setting the thicknesses, the thermal expansion coefficients, and the like of the element substrates 73, 72, 74b and 74a, which have optical transparency, configuring the liquid crystal unit 26b of the liquid crystal light valve 25b, the occurrence of an unintended phase difference is prevented. Accordingly, the occurrence of display unevenness can be suppressed.

Referring back to FIG. 1, the cross dichroic prism 27 corresponds to a light-composition optical system. The cross dichroic prism 27 forms an approximately square shape in plane view by bonding four rectangular prisms. In addition, on the boundary faces formed by bonding the rectangular prisms, one pair of the dichroic mirrors 27a and 27b intersecting with each other in the "X" shape are formed. Both the dichroic mirrors 27a and 27b are formed as multi-layer dielectric films having different characteristics. In other words, the first dichroic mirror 27a as one of the dichroic mirrors 27a and 27b reflects B beams, and the second dichroic mirror 27b as the other dichroic mirror reflects R beams. This cross dichroic prism 27 reflects the B beams after modulation that are output from the liquid crystal light valve 25a by using the first dichroic mirror 27a so as to be output to the right side in the traveling direction, outputs the G beams after modulation that are output linearly from the liquid crystal light valve 25b through the first and second dichroic mirrors 27a and 27b, and reflects the R beams after modulation that are output from the liquid crystal light valve 25c by using the second dichroic mirror 27b so as to be output to the left side in the traveling direction. In addition, as described above, the first and second dichroic mirrors 27a and 27b reflect the B beams and the R beams that are in the S-polarized state perpendicular to the surface of the figure, and both the dichroic mirrors 27a and 27b transmit the G beams that are in the P-polarized state parallel to the surface of the figure. Accordingly, the composition efficiency of BGR beams in the cross dichroic prism 27 can be raised, whereby the occurrence of color unevenness can be suppressed.

The projection lens 29 projects image light of a color synthesized by the cross dichroic prism 27 on a screen (not shown) with a desired multiplication factor as a projection unit or a projection optical system. In other words, a color moving picture or a color still image corresponding to driving signals or image signals that are input to the liquid crystal units 26a to 26c is projected with a desired multiplication factor on the screen.

As is apparent from the description presented above, according to the projector 10 of this embodiment, in the electro-optical display devices, that is, the liquid crystal units 26a, 26b, and 26c that are built in the projector 10, any one or more of values of the thermal expansion coefficients of a plurality of element substrates configured to include the driving substrate 73, the opposing substrate 72, the outgoing-side dust-protective substrate 74b, the incident-side dust-protective substrate 74a, and the like are negative, and any one or more of the values are positive. As a result, a phase difference given to passing light due to distortion generated due to a temperature distribution within the element substrate having a negative thermal expansion coefficient and a phase difference given to passing light due to distortion generated due to a temperature distribution within the element substrate having a positive thermal expansion coefficient are operated so as to be offset each other. Accordingly, the effect of a decrease in the phase difference that is achieved by the plurality of element substrates 73, 72, 74b, and 74a as a whole can be greater than the effect of a decrease in the phase difference that is achieved by the individual element substrates 73, 72, 74b, and 74a. Therefore, the display unevenness of the liquid crystal units 26a, 26b, and 26c can be further suppressed.

Second Embodiment

Hereinafter, a projector according to a second embodiment of the invention will be described. The projector of the second embodiment is acquired by modifying the projector of the first embodiment. Thus, portions not specifically described here are the same as those of the first embodiment.

Figure 9:
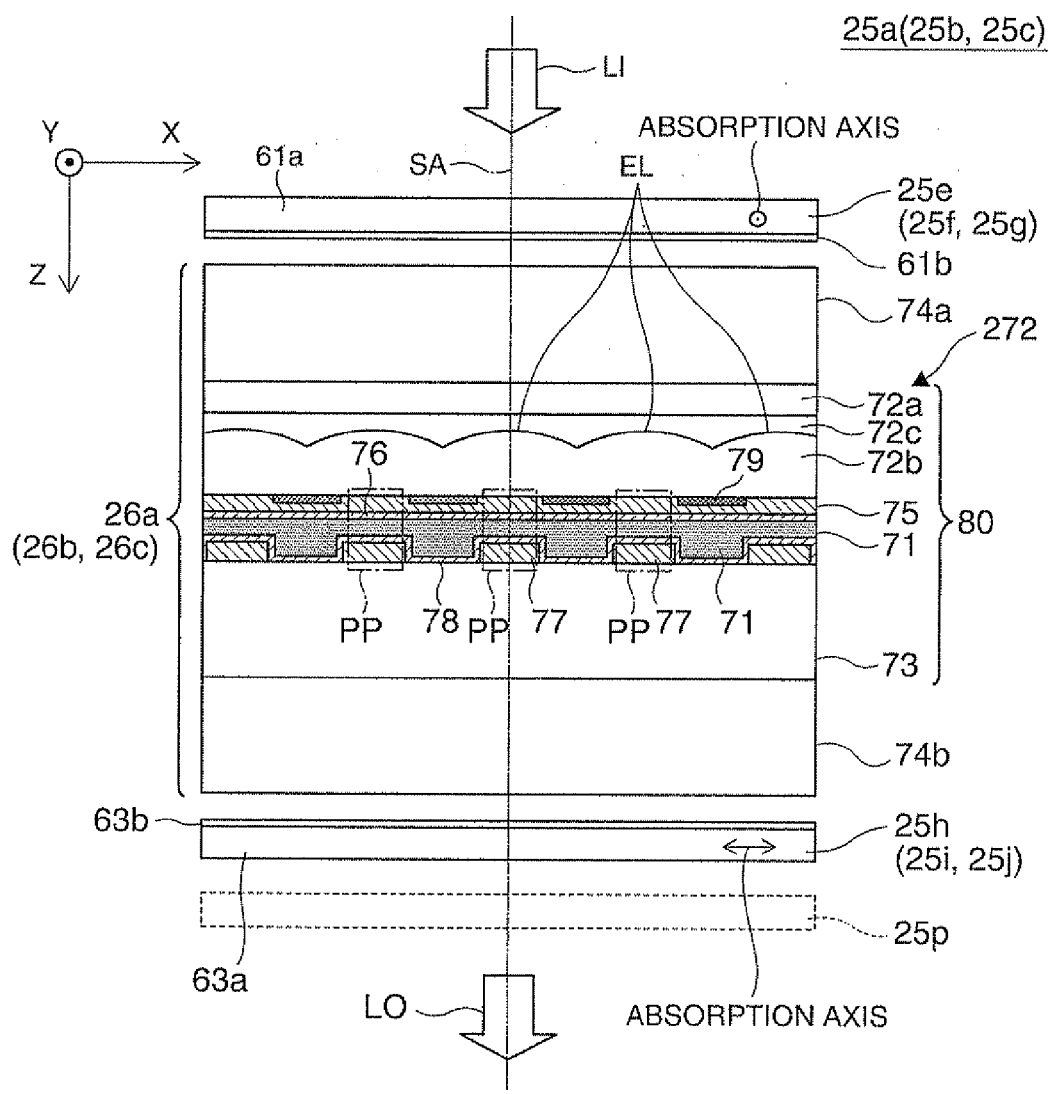
FIG. 9 is a side cross-sectional view of a liquid crystal unit according to a second embodiment.

FIG. 9 is an enlarged cross-sectional view illustrating the structure of the liquid crystal light valve 25a and the like that are built in the projector of the second embodiment. In this case, a micro lens array is built in an opposing substrate 272 disposed on the light-incident side. Described in more detail, the opposing substrate 272 includes a flat plate substrate 72a and a lens substrate 72b. The opposing substrate 272 has a structure in which a bonding layer 72c having a relatively low refractive index is interposed between the two substrates 72a and 72b having relatively high refractive indices. Accordingly, the micro lens array that is configured by a plurality of element lenses EL arranged two-dimensionally in a predetermined pattern corresponding to the pixel portions PP can be formed within the opposing substrate 272. Here, the bonding layer 72c, for example, is made from acrylic resin, silicon resin, or the like. In addition, by arranging the micro lens array in a portion of the opposing substrate 272 that is disposed on the light-incident side, the incident light LI can be divided by the element lens EL corresponding to each pixel portion PP and can be collected in each pixel portion PP. In other words, the incident light LI can be allowed to be incident to the pixel portions PP by avoiding the black matrixes 79, and whereby the use efficiency of the incident light LI in the liquid crystal panel 80 can be raised.

Also in this embodiment, at least any one of values of the thermal expansion coefficients of the plurality of element substrates configured to include the driving substrate 73, the opposing substrate 72, the outgoing-side dust-protective substrate 74b, the incident-side dust-protective substrate 74a, and the like is negative, and at least any one of the values is positive. Here, the thermal expansion coefficients of the flat plate substrate 72a and the lens substrate 72b configuring the opposing substrate 272 are preferably configured so as to approximately coincide with each other from the viewpoint of avoiding deformation, distortion, and the like. In other words, the materials of the flat plate substrate 72a or the lens substrate 72b may have either a positive thermal expansion coefficient or a negative thermal expansion coefficient. However, it is preferable that the materials of the flat plate substrate 72a and the lens substrate 72b are the same.

Hereinafter, concrete examples will be described. The following Table 2 is formed by collecting data of Example 9.

TABLE 2

|  |  |  |  | Example 9 |
|---|---|---|---|---|
| Driving substrate | Material |  |  | quartz |
|  | Average linear expansion coefficient | $\alpha 1$ | $\times 10^{-7}/k$ | 5.5 |
|  | Thickness | d1 | mm | 1.1 |
|  | Refractive index | n1 |  | 1.459 |
| Opposing substrate | Material |  |  | Neoceram + acryl |
|  | Average linear expansion coefficient | $\alpha 2$ | $\times 10^{-7}/k$ | −5.9 |
|  | Thickness | d2 | mm | 1.1 |
|  | Refractive index | n2 |  | 1.523 |
| Outgoing-side dust-protective substrate | Material |  |  | neoceram |
|  | Average linear expansion coefficient | $\alpha 3$ | $\times 10^{-7}/k$ | −6 |
|  | Thickness | d3 | mm | 1 |
|  | Refractive index | n3 |  | 1.541 |
| Incident-side dust-protective substrate | Material |  |  | quartz |
|  | Average linear expansion coefficient | $\alpha 4$ | $\times 10^{-7}/k$ | 5.5 |
|  | Thickness | d4 | mm | 1.1 |
|  | Refractive index | n4 |  | 1.459 |
| $d1 \cdot \alpha 1 + d2 \cdot \alpha 2 + d3 \cdot \alpha 3 + d4 \cdot \alpha 4$ |  |  | $\times 10^{-7}$ mm/k | −0.39 |
| $n1 \cdot d1 \cdot \alpha 1 + n2 \cdot d2 \cdot \alpha 2 + n3 \cdot d3 \cdot \alpha 3 + n4 \cdot d4 \cdot \alpha 4$ |  |  | $\times 10^{-7}$ mm/k | −1.5 |
| Display unevenness |  |  |  | good |
| $d1 \cdot \alpha 1$ |  |  |  | 6.05 |
| $d2 \cdot \alpha 2$ |  |  |  | −6.49 |
| $d3 \cdot \alpha 3$ |  |  |  | −6.00 |
| $d4 \cdot \alpha 4$ |  |  |  | 6.05 |
| Absolute value of minimum value |  |  | |pm| | 6.49 |

TABLE 2-continued

|  |  | Example 9 |
|---|---|---|
| Absolute value of maximum value | \|pp\| | 6.05 |
| Difference between absolute value of minimum value and absolute value of maximum value | \|dm\| | 0.44 |

As is apparent from Table 2, it can be seen that the display unevenness is suppressed to some degree so as not to cause any problem in Example 9.

The embodiments of the invention have been described as above. However, the invention is not limited to the above-described embodiments and may be performed in various forms in the range not departing from the basic concept thereof. For example, the following modifications can be made.

In other words, in the above-described embodiments, in the liquid crystal units 26a, 26b, and 26c, the outgoing-side dust-protective substrate 74b as the first light-transmissive substrate and the incident-side dust-protective substrate 74a as the second light-transmissive substrate are disposed on the outer sides of the liquid crystal panel 80. However, as the first and second light-transmissive substrates configuring the liquid crystal unit, substrates other than the dust-protective substrates 74b and 74a can be disposed. In particular, instead of the dust-protective substrates 74b and 74a, cover glass, touch panel substrates, or the like can be disposed. In such a case, by adjusting the thermal expansion coefficients, the thicknesses, and the like of the element substrates, the display unevenness generated by the liquid crystal unit (for example, a direct-viewing type display device disposed inside a vehicle) can be decreased.

In addition, in the above-described embodiments, the vertically-aligned liquid crystal layer 71 is used as the liquid crystal panel 80. However, a twisted nematic-type liquid crystal layer 71 can be used.

In addition, in the above-described embodiments, the shape of the driving substrate 73, the opposing substrate 72, the outgoing-side dust-protective substrate 74b, and the incident-side dust-protective substrate 74a is a rectangle. However, even when the element substrates 73, 72, 74b, and 74a have a shape of a square or any other shape, the same advantages can be acquired.

In addition, in the above-described embodiments, in a case where the number of the element substrates such as the driving substrate 73, the opposing substrate 72, the outgoing-side dust-protective substrate 74b, and the incident-side dust-protective substrate 74a that are built in the liquid crystal unit 26a is four or more, the absolute values of a maximum value and a minimum value of product-sum operation values of the thicknesses and the thermal expansion coefficients of the element substrates are configured to be equal to or greater than $3 \times 10^{-7}$ [mm/K]. However, even in a case where the absolute values are equal to or smaller than $3 \times 10^{-7}$ [mm/K], by employing the configuration described in the above-described embodiments, unintended phase differences given to the luminous flux passing through the element substrates tend to be offset with each other, whereby the display unevenness of the liquid crystal light valve 25a can be decreased.

In the above-described embodiments, the light output from the lens array 21e is converted into linearly polarized light polarized, for example, in the first polarization direction that is parallel to the surface of FIG. 1 by the polarization converting member 21g, and the half-wavelength plate 25p is disposed on the light-outgoing side of the liquid crystal light valve 25b for the G beams that are transmitted through the dichroic mirrors 27a and 27b of the cross dichroic prism 27. However, it may be configured that the light output from the lens array 21e is converted into linearly polarized light polarized, for example, in the second polarization direction that is perpendicular to the surface of FIG. 1 by the polarization converting member 21g, and the half-wavelength plates are disposed respectively on the light-outgoing sides or the light-incident sides of the liquid crystal light valves 25a and 25c for the B and R beams that are reflected by the dichroic mirrors 27a and 27b of the cross dichroic prism 27.

In the projectors 10 of the above-described embodiments, the light source device 21 is configured by the light source lamp 21a, one pair of the lens arrays 21d and 21e, the polarization converting member 21g, and the composite lens 21i. However, the lens arrays 21d and 21e and the like may be omitted and the light source lamp 21a may be substituted by a separate light source such as an LED, or the like.

In the above-described embodiments, only examples in which the projector 10 uses three liquid crystal light valves 25a, 25b, and 25c have been described. However, the invention can be applied to a projector using one or two liquid crystal light valves or a projector using four or more liquid crystal light valves.

In the above described embodiments, only examples of the front-type projectors in which projection is performed from the observation side of the screen have been described. However, the invention can be applied to a projector of a rear type in which projection is performed from a side opposite to the observation side of the screen.

The entire disclosure of Japanese Patent Application No. 2009-135869, filed Jun. 5, 2009 is expressly incorporated by reference herein.

What is claimed is:

1. An electro-optical display device comprising:
   a transmission-type liquid crystal panel including a liquid crystal, a driving substrate having an outer side opposite the liquid crystal, and an opposing substrate having an outer side opposite the liquid crystal, the liquid crystal being disposed between the driving substrate and the opposing substrate;
   a first light-transmissive substrate disposed on the outer side of the driving substrate;
   a second light-transmissive substrate disposed on the outer side of the opposing substrate, and
   a plurality of element substrates including at least the driving substrate, the opposing substrate, the first light-transmissive substrate, and the second light-transmissive substrate, at least one substrate of the plurality of element substrates having negative thermal expansion coefficients and at least another substrate of the plurality of element substrates having positive thermal expansion coefficients,
   under the condition that the thermal expansion coefficients of the driving substrate, the opposing substrate, the first light-transmissive substrate, and the second light-transmissive substrate are $\alpha 1$, $\alpha 2$, $\alpha 3$, and $\alpha 4$, respectively,
   refractive indices of the driving substrate, the opposing substrate, the first light-transmissive substrate, and the second light-transmissive substrate are n1, n2, n3, and n4, respectively, and
   thicknesses of the driving substrate, the opposing substrate, the first light-transmissive substrate, and the second light-transmissive substrate are d1, d2, d3, and d4, respectively,
   the refractive indices n1 to n4 being within the range of $1.5 \pm 0.1$, and a product sum operation value $d1 \cdot \alpha 1+$ $d2·α2+d3·α3+d4·α4$ of the thicknesses and the thermal expansion coefficients being within the range of $0±17×10^{-7}$ [mm/K], and a product sum operation value $n1·d1·α1+n2·d2·α2+n3·d3·α3+n4·d4·α4$ of the refractive indices, the thicknesses, and the thermal expansion coefficients being within the range of $0±24×10^{-7}$ [mm/K].

2. The electro-optical display device according to claim 1, the product sum operation value $d1·α1+d2·α2+d3·α3+d4·α4$ of the thicknesses and the thermal expansion coefficients being within the range of $0±6×10^{-7}$ [mm/K].

3. The electro-optical display device according to claim 1, the product sum operation value $n1·d1·α1+n2·d2·α2+n3·d3·α3+n4·d4·α4$ of the refractive indices, the thicknesses, and the thermal expansion coefficients being within the range of $0±9×10^{-7}$ [mm/K].

4. The electro-optical display device according to claim 1, wherein, when the thermal expansion coefficients of the driving substrate, the opposing substrate, the first light-transmissive substrate, and the second light-transmissive substrate are $α1$, $α2$, $α3$, and $α4$, respectively, and values of thicknesses of the driving substrate, the opposing substrate, the first light-transmissive substrate, and the second light-transmissive substrate are $d1$, $d2$, $d3$, and $d4$, respectively, absolute values of a maximum value and a minimum value of product sum operation values $d1·α1$, $d2·α2$, $d3·α3$, and $d4·α4$ of the thicknesses and the thermal expansion coefficients are equal to or greater than $3×10^{-7}$ [mm/K].

5. The electro-optical display device according to claim 1, wherein one of values of the thermal expansion coefficients of the driving substrate and the first light-transmissive substrate is negative, and the other is positive, and wherein one of values of the thermal expansion coefficients of the opposing substrate and the second light-transmissive substrate is negative, and the other is positive.

6. A projector comprising:
at least one or more of the electro-optical display devices according to claim 1;
an illumination device that illuminates the at least one or more of the electro-optical display devices; and
a projection lens that projects an image formed by the at least one or more of the electro-optical display devices.

7. A projector comprising:
at least one or more of the electro-optical display devices according to claim 2;
an illumination device that illuminates the at least one or more of the electro-optical display devices; and
a projection lens that projects an image formed by the at least one or more of the electro-optical display devices.

8. A projector comprising:
at least one or more of the electro-optical display devices according to claim 3;
an illumination device that illuminates the at least one or more of the electro-optical display devices; and
a projection lens that projects an image formed by the at least one or more of the electro-optical display devices.

9. A projector comprising:
at least one or more of the electro-optical display devices according to claim 4;
an illumination device that illuminates the at least one or more of the electro-optical display devices; and
a projection lens that projects an image formed by the at least one or more of the electro-optical display devices.

10. A projector comprising:
at least one or more of the electro-optical display devices according to claim 5;
an illumination device that illuminates the at least one or more of the electro-optical display devices; and
a projection lens that projects an image formed by the at least one or more of the electro-optical display devices.

* * * * *